US005790499A

United States Patent [19]

Itoh

[11] Patent Number: 5,790,499
[45] Date of Patent: Aug. 4, 1998

[54] METHOD FOR PROTECTING DATA RECORDED ON A PARTIAL READ-ONLY MEMORY (ROM) MEDIUM FROM UNAUTHORIZED COPYING

[75] Inventor: Masaki Itoh, Tokyo, Japan

[73] Assignee: NEC Corporation, Tokyo, Japan

[21] Appl. No.: 786,645

[22] Filed: Jan. 21, 1997

Related U.S. Application Data

[62] Division of Ser. No. 423,454, Apr. 19, 1995, Pat. No. 5,654,950.

[30] Foreign Application Priority Data

May 10, 1994  [JP]  Japan ............................. 6-96770

[51] Int. Cl.$^6$ ............................. G11B 5/09; G11B 3/64
[52] U.S. Cl. ............................. 369/84; 369/47; 369/53; 711/111
[58] Field of Search ............................. 371/37.1, 40.1; 369/32, 33, 47, 48, 50, 54, 58, 84, 85; 360/15

[56] References Cited

U.S. PATENT DOCUMENTS 5,043,960  8/1991  Nakao et al. ............................. 369/13
5,226,027  7/1993  Bakx ............................. 369/58
5,517,632  5/1996  Matsumoto et al. ............................. 395/441

FOREIGN PATENT DOCUMENTS 482039  3/1992  Japan.
4356760  12/1992  Japan.

*Primary Examiner*—Reba I. Elmore
*Assistant Examiner*—Emmanuel L. Moise
*Attorney, Agent, or Firm*—Whitham, Curtis, Whitham & McGinn

[57] ABSTRACT

A method and apparatus for preventing generation of third generation data of an original data recorded on a read-only region of a partial read-only memory (ROM) optical disk includes an operation for copying source data from the partial read-only memory to a read-write medium by first attempting to write check data on a read-write region of the partial ROM optical disk. If the check data cannot be written, the copy operation terminates. If the check data can be written, the source data is overwritten. Then, the source data is copied from the partial ROM optical disk to the read-write medium.

9 Claims, 14 Drawing Sheets

85: CHECK DATA

84: OVERWRITING DATA
81: COPY SOURCE DATA

METHOD FOR PROTECTING DATA RECORDED ON A PARTIAL READ-ONLY MEMORY (ROM) MEDIUM FROM UNAUTHORIZED COPYING

This is a Divisional Application of application Ser. No. 08/423,454 filed Apr. 19, 1995, now U.S. Pat. No. 5,654,950.

BACKGROUND OF THE INVENTION

The present invention relates to a method for protecting data recorded on a partial read-only memory (ROM) medium from unauthorized copying, and more particularly, to a method for preventing generation of "third generation data" of an original data recorded on the partial ROM medium.

In this specification, a "read-write region" refers to a region of a data recording medium in which recording and reproduction can be performed.

A "read-only" region refers to a region of a data recording medium in which only reproduction can be performed.

In this specification, "partial ROM medium" refers to a data recording medium having both a read-write region and a read-only region. The partial ROM medium includes partial ROM optical disks. The structure of a partial ROM optical disk is described below.

A "read-only medium" refers to a data recording medium having only a read-only region.

A "read-write medium" refers to a data recording medium having only a read-write region.

"First generation data" refers to data recorded on an original medium. Typically, the first generation data is released from a software developer.

"Second generation data" refers to data produced by copying the first generation data from the original medium to a second medium.

"Third generation data" refers to data produced by copying the second generation data from the second medium to a third medium.

A first conventional technique for preventing the generation of the third generation data is disclosed in Japanese Unexamined Patent Publication No. 82039/1992.

In the first conventional technique, an overwriting data is overwritten onto the copy source data prior to copying the copy source data. If the copy source data is first generation data recorded on a read-only medium, the overwriting operation does not destroy the copy source data. On the other hand, if the copy source data is the second generation data recorded on a read-write medium, the copy source data is destroyed by the overwriting data. This selective destruction allows the generation of the second generation data, but prevents the generation of the third generation data.

A second conventional technique for preventing the execution of second generation program data is disclosed in Japanese Unexamined Patent Publication No. 356760/1992. In the second conventional technique, a pass-word which cannot be copied by the copy operation is recorded on an original disk. A program is executed after confirming that the predetermined pass-word is recorded along with the program. That is, the program cannot be executed without the original disk.

However, the aforementioned conventional techniques have the following problems.

For example, in the first conventional technique, the copy operation cannot be prevented when the copy source medium is set in a write-protect state. When the copy source medium is set in the write-protect state, the overwriting data is not overwritten on the copy source data. Therefore, the copy source data on a read-write medium (second generation data) is not destroyed and third generation data is generated.

The problem can be solved by providing a medium-state determining means. In this improvement, the state of the disk is determined prior to the overwriting operation. If the copy source medium is set in the write-protect state, the copy operation is inhibited. According to this method, the copy operation is permitted only when the copy source medium is set in the write-enable state.

However, this improvement also has a problem that the improvement requires a special storage device with the medium state determining means.

The second conventional technique also has a problem in that the original disk is easily damaged because the original disk is frequently subjected to the read operation.

SUMMARY OF THE INVENTION

In view of the aforementioned problems of the conventional techniques, a first object of the present invention is to prevent the generation of third generation data. In a first embodiment, by using the characteristics of the partial ROM medium, a method for protecting data recorded on a medium from unauthorized copying can be performed without special storage devices. More specifically, the first embodiment can be applied to any storage device that generates normal and abnormal termination signals of a recording operation.

A second object of the present invention is to protect an original disk from damage. More specifically, the second object of the present invention is to prevent the generation of a third generation key disk while allowing the generation of a second generation key disk and the replacement of the second generation key disk.

The first object is achieved by the following copy operation for copying source data from a first medium to a second medium. The first medium includes a first region and a second regions. The second region stores the source data.

At first, a control apparatus attempts to write check data on the first region of the first medium. If the check data cannot be written, the operation is terminated by the control apparatus. If the check data can be written, the source data is overwritten. Thereafter, the source data is copied to the second medium.

In the aforementioned copy operations, the first medium is preferably a partial ROM medium. The first and second regions are preferably a read-write region and a read-only region of the partial ROM medium.

The aforementioned copy operations are performed with a storage device which outputs a normal termination signal and an abnormal termination signal according to a result of the writing operation. The control apparatus receives the normal and abnormal termination signals for determining that the check data can be written.

The second object is achieved by the following copy operation for copying source data from a first medium to a second medium. The first medium includes a first region and a second regions. The second region stores the source data. The source data includes key data and program data.

At first, a control apparatus attempts to write check data on the first region of the first medium. If the check data cannot be written, the operation is terminated by the control apparatus. If the check data can be written, the source data is copied to the second medium. Thereafter, overwriting data is written over the source data on the first medium.

The overwriting data is preferably written over the key data of the source data.

When the program data on a third medium is executed, it is confirmed whether key data is recorded on the third medium. If the key data is not recorded, the program data is not executed.

BRIEF DESCRIPTION OF THE DRAWINGS

Other objects, features and advantages of the present invention will become more apparent when the following description is read in conjunction with the accompanying drawings, wherein.

In these drawings, the same reference numerals depict the same parts, respectively.

DETAILED DESCRIPTION OF THE PREFERRED EMBODIMENTS

Next is described the first embodiment of the present invention with reference to the accompanying drawings.

Figure 1:
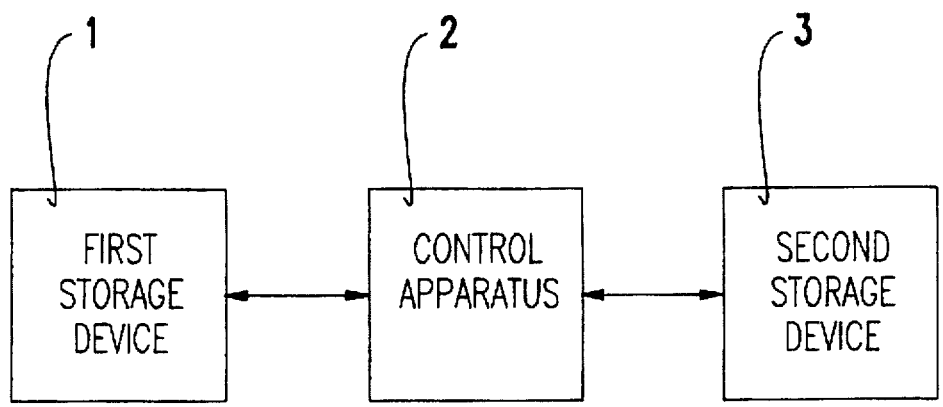
FIG. 1 is a block diagram showing the configuration of a first storage device 1, a second storage device 3 and a control apparatus 2 according to a first embodiment of the present invention.

Referring to FIG. 1, a control apparatus 2 is connected to a first storage device 1 and a second storage device 3.

The first storage device 1 is a read-write storage device such as an optical disk drive 1' for partial ROM optical disks.

The data communication between the first storage device 1 and the control apparatus 2 is performed as follows.

When data is written, the control apparatus 2 transmits the data and the position of the data to the first storage device 1. Receiving the data and its position, the first storage device 1 records the data on the position of the medium. When the write operation is performed normally, the first storage device 1 outputs a normal termination signal to the control apparatus 2. When the write operation is not performed normally, the first storage device 1 outputs an abnormal termination signal to the control apparatus 2.

The second storage device 3 is a read-write type storage device such as a floppy disk drive, a hard disk drive, or a random access memory (RAM) disk drive.

Next is described the structure of the partial ROM optical disk.

Figure 2:
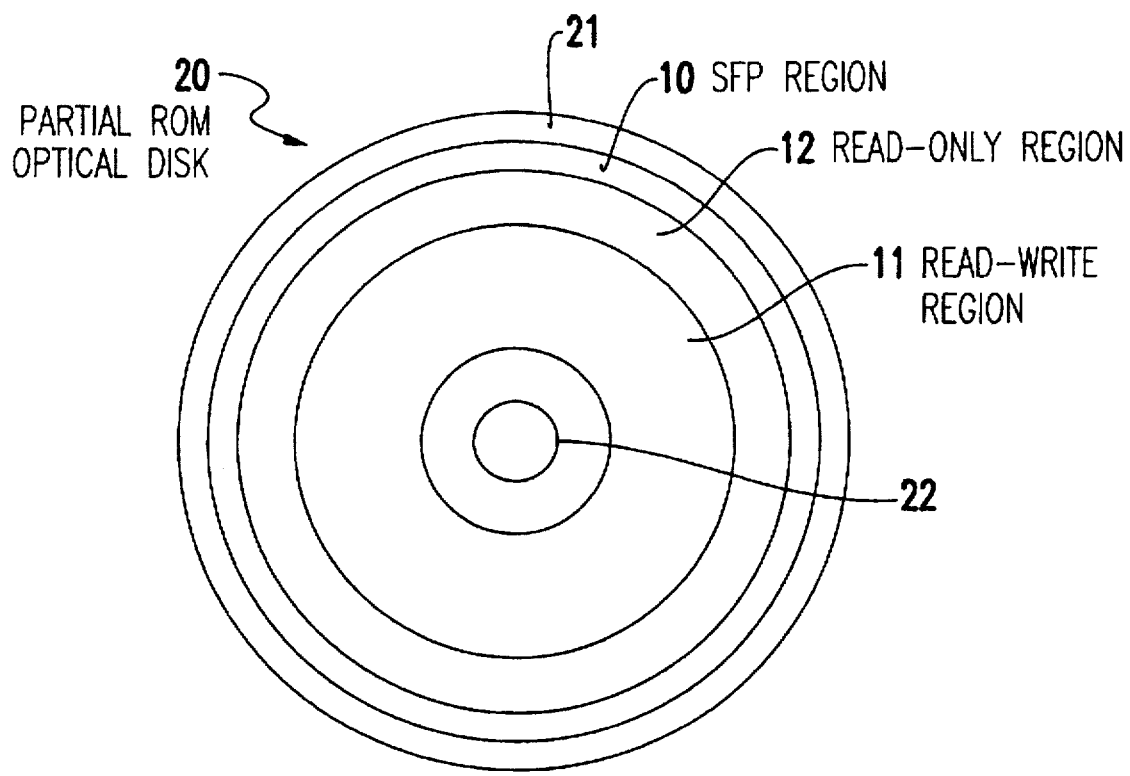
FIG. 2 shows the structure of a partial ROM optical disk medium 20.

Referring to FIG. 2, the partial ROM optical disk 20 is a type of optical magnetic disk. The size and structure of the partial ROM optical disk 20 conform to the standards of the International Organization for Standardization (ISO). However, the present invention can be equally applied to nonstandard partial ROM optical disks.

According to the ISO, the partial ROM optical disk 20 includes a standard format pattern (SFP) region 10, a read-write region 11 and a read-only region 12. The SFP region 10 stores control information specific to the partial ROM optical disk. A normal user cannot read the control information out of the SFP is region 10. The read-write region 11 is a region in which reading and writing can be done. The read-only region 12 is a region in which only reading can be done. The data stored in the read-only region 12 cannot be altered. In the present embodiment, copy source data is recorded in the read-only region 12.

Next is described the detailed structures of the read-write region 11 and read-only region 12.

Figure 3:
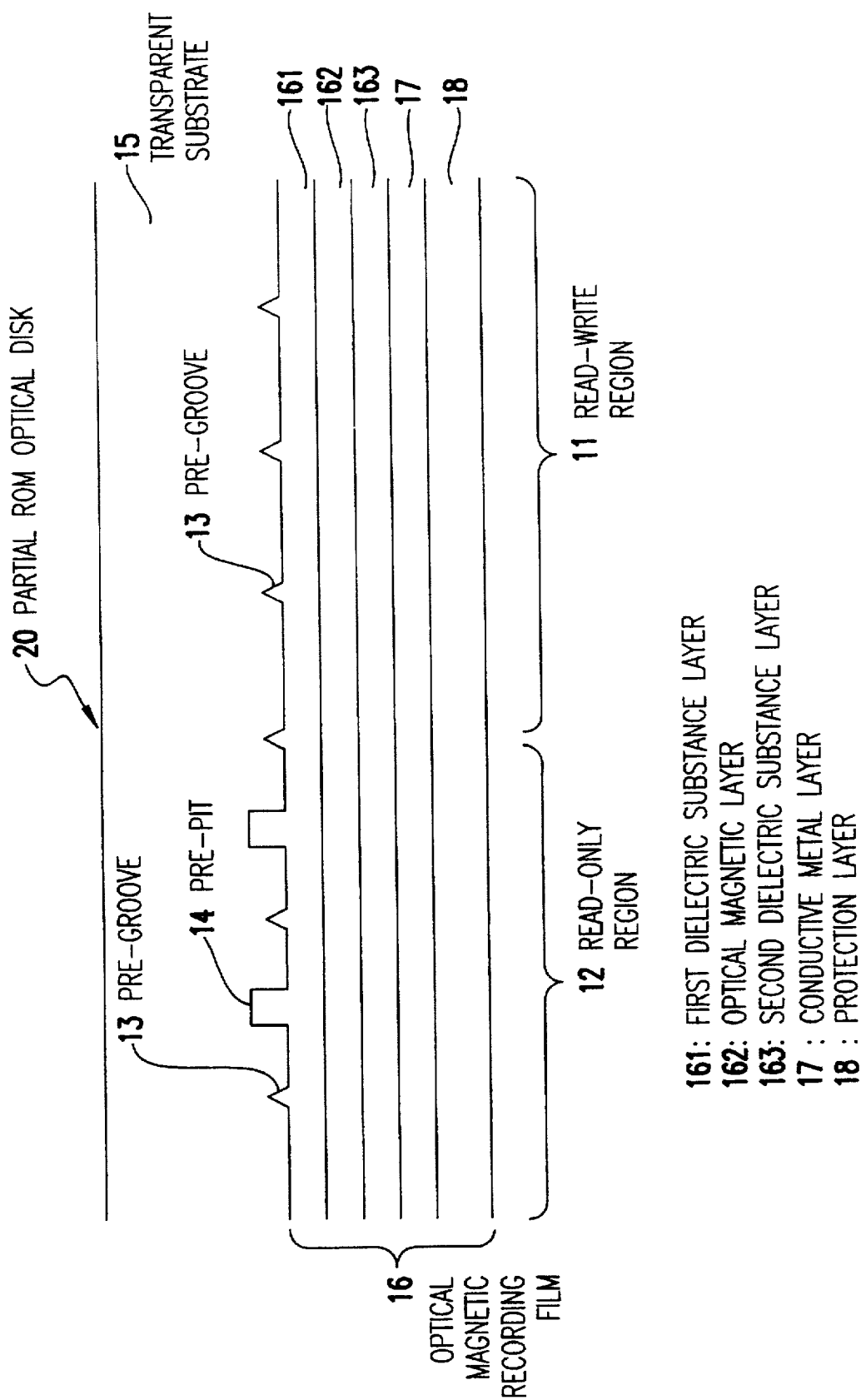
FIG. 3 shows the cross-sections of a read-write region 11 and a read-only region 12 of the partial ROM optical disk medium 20 in FIG. 2.

Referring to FIG. 3, the partial ROM optical disk 20 includes a protection layer 18, a conductive metal layer 17, an optical magnetic recording film 16 and a transparent substrate 15. The optical magnetic recording film 16 includes a first dielectric substance layer 161, an optical magnetic layer 162 and a second dielectric substance layer 163. The transparent substrate 15 is provided with pre-grooves 13 for scanning. Information is recorded in the read-only region 12 in advance as pre-pits 14.

Next is described the mechanism and the operation of the optical disk drive 1'.

Figure 4:
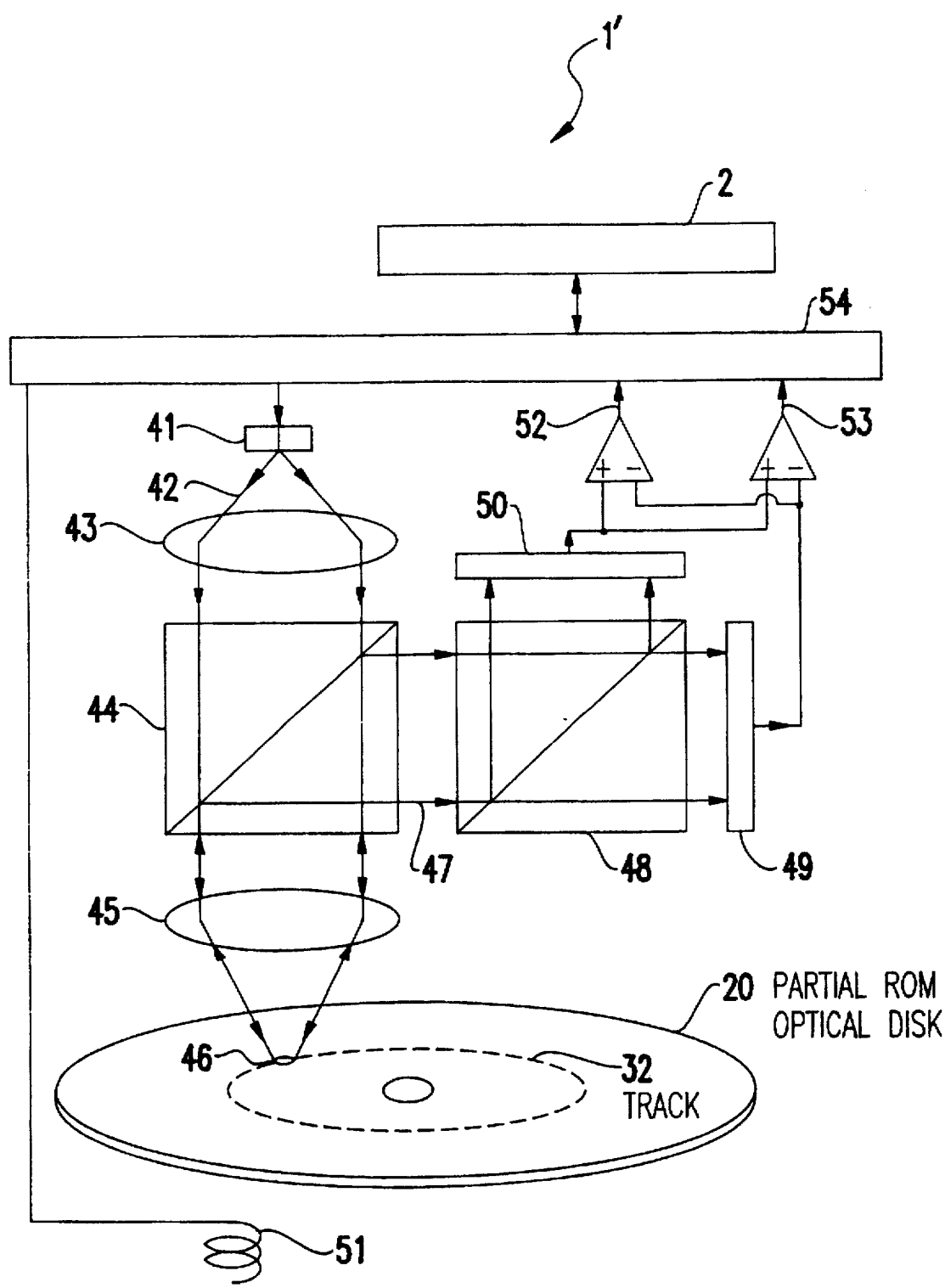
FIG. 4 is a block diagram showing the structure of the optical disk drive 1'.

Referring to FIG. 4, the data-write operation to the read-write region 11 of the partial ROM optical disk medium 20 is performed as follows. A direct current (DC) current is supplied to a bias coil 51 in advance. The DC current generates a magnetic field in a vertical direction inside of the partial ROM optical disk medium 20. The data supplied from the control apparatus 2 is current-modulated by a first storage device control unit 54. The current based on the data is supplied to a semiconductor laser 41. The semiconductor laser 41 varies the intensity of a laser beam 42 in response to the supplied current. The laser beam 42 is focused on a spot 46 by suitable optics such as a collimating lens 43, a beam splitter 44 and an objective lens 45. In the spot 46 in the optical magnetic layer 162 of the partial ROM optical disk 20, the power of the laser beam is approximately 2 to 10 mW. When the intensity of the laser beam 42 supplied from the semiconductor laser 41 is relatively strong, the temperature of a portion of the optical magnetic layer 162 in the spot 46 increases. The portion where the temperature increases is magnetized in a direction parallel to the magnetic field generated by the bias coil 51. Information can be recorded by selectively providing the magnetized portion in this way.

The data read operation from the read-write region 11 of the partial ROM optical disk medium 20 is performed as follows.

First, a track 32 is scanned by the laser beam 42. The intensity of the laser beam 42 is about 2 mW at the spot 46. A polarized direction of a reflection beam 47 changes based on the magnetized state of the read-write region 11. This change is caused due to the Kerr effect and Faraday effect. The reflection beam 47 is input into an analyzer 48 and is divided into two components which are orthogonal to each other. The two components are detected by optical detectors 49 and 50, respectively. The recorded information can be read by sensing a difference signal 52 indicative of the difference between the detected values of the optical detectors 49 and 50.

Next is described the method of reading data which is written on the read-only region 12 of the partial ROM optical disk medium 20.

First, similarly to the read operation from the read-write region 11, the laser beam 42 is scanned. The pre-pits 14 of the read-only region 12 changes the intensity of the reflection beam 47. The intensity change is detected as a sum signal 53 indicative of a sum of the detected values of the optical detectors 49 and 50. The data recorded on the SFP region 10 can be read out by processing the sum signal 53.

Next, the detailed structure of the control apparatus 2 will be described below.

Figure 5:
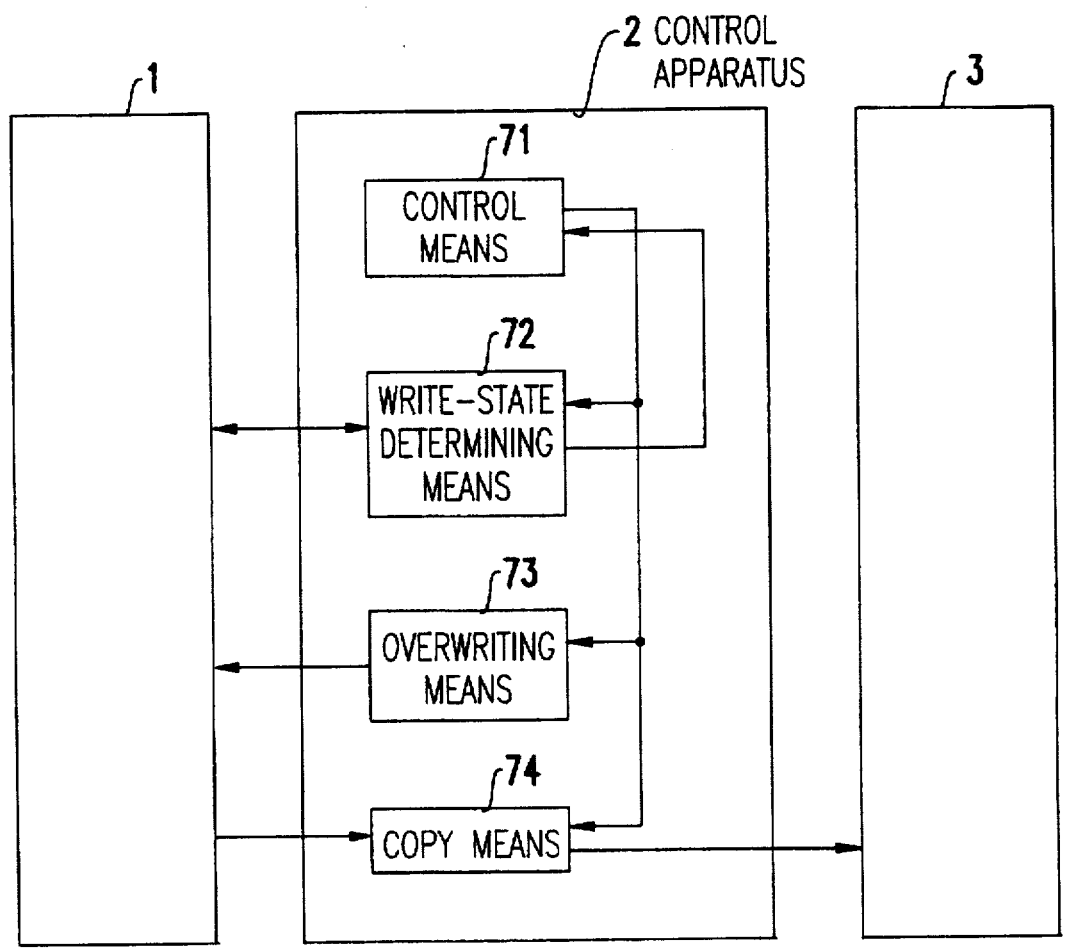
FIG. 5 is a block diagram showing the structure of the control apparatus 2 according to the first embodiment of the present invention.

Referring to FIG. 5, the control apparatus 2 includes control means 71, write-state determining means 72, overwriting means 73 and copy means 74. The control apparatus may be a digital computer and the aforementioned means may be implemented by software programs executed by the control apparatus 2 or well-known hardware.

The write-state determining means 72 determines whether the medium in the first storage device 1 is in the write-protect state or the write-enable state. The determination result is sent to the control means 71.

Figure 7A:
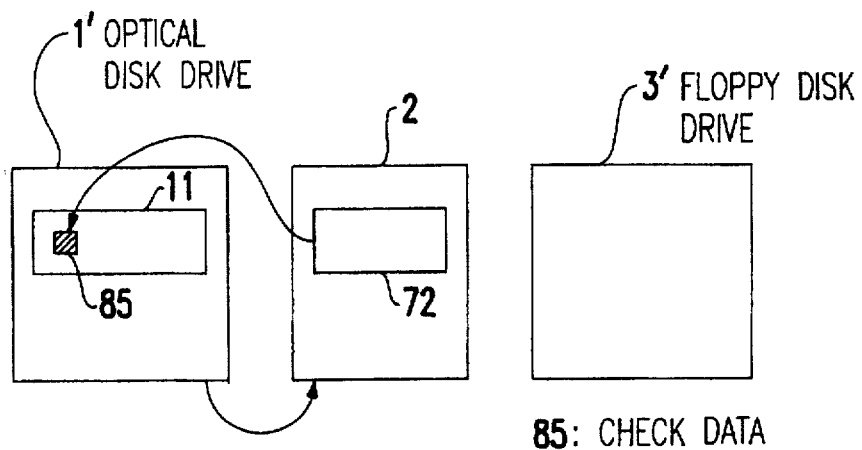
FIGS. 7 (a), 7 (b) and 7 (c) illustrate steps of generating the second generation data in the first embodiment of the present invention.

More specifically, the write-state determining means 72 instructs the first storage device 1 to write a check data 85 on the medium. If the first storage device outputs a normal termination signal, the medium is in the write-enable state. If the first storage device outputs an abnormal termination signal, the medium is in the write-protect state. The position of the check data 85 (shown in FIG. 7(a)) is selected so that it is written in the read-write region 11 of the partial ROM optical disk 20 when the partial ROM optical disk 20 is loaded in the first storage device 1.

Figure 7B:
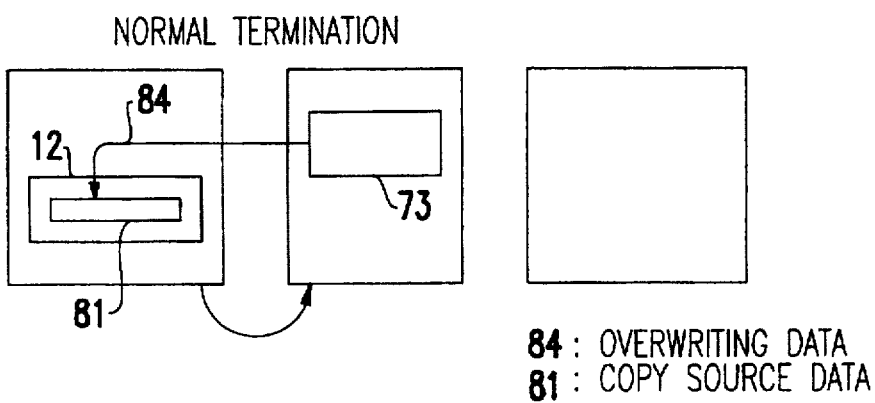

The overwriting means 73 destroys copy source data recorded on a read-write medium. The copy source data recorded on the read-only medium or on the read-only region of the partial ROM medium is not destroyed. This selective destruction is performed by overwriting the overwriting data 84 (e.g., shown in FIG. 7(b)) on the copy source data.

The copy means 74 copies the copy source data from the first storage device 1 to the second storage device 3.

The control means 71 controls the write-state determining means 72, the overwriting means 73 and the copy means 74.

Next is described the steps of the copy operation from the first storage device 1 to the second storage device 3.

Figure 6:
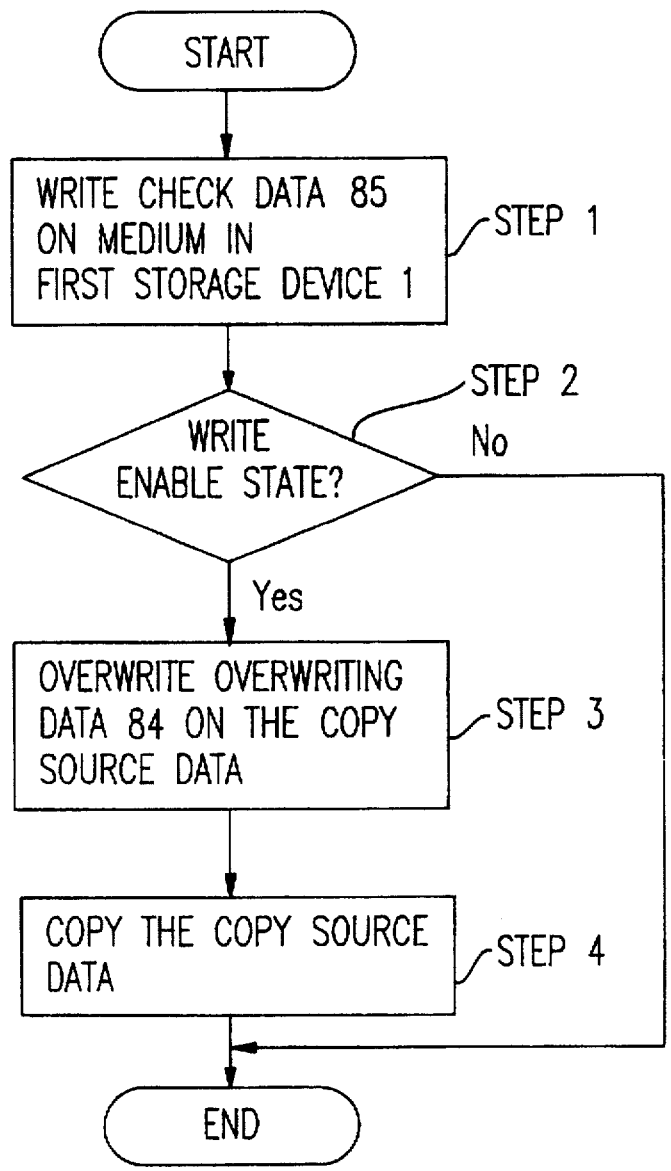
FIG. 6 is a flow-chart showing steps of a copy operation performed by the control apparatus 2 according to the first embodiment of the present invention.

Referring to FIG. 6, in step 1, the control means 71 initiates the write-state determining means 72. The write-state determining means 72 determines the state of the medium in the first storage device 1.

In step 2, if the medium in the first storage device 1 is in the write-enable state, the control apparatus proceeds with step 3. Otherwise, the copy operation is terminated by the control apparatus.

In step 3, the control means 71 initiates the overwriting means 73. The overwriting means 73 overwrites the overwriting data 84 on the copy source data 81.

In step 4, the control means 71 initiates the copy means 74. The copy means 74 copies the copy source data from the first storage device 1 to the second storage device 3.

Next is described the generation of the second generation data according to the copy operation described above. The first generation data is recorded on the read-only region 12 of the partial ROM optical disk 20. In this example, the first storage device 1 is the optical disk drive 1' and the second storage device 3 is a floppy disk drive 3'.

Figure 7C:
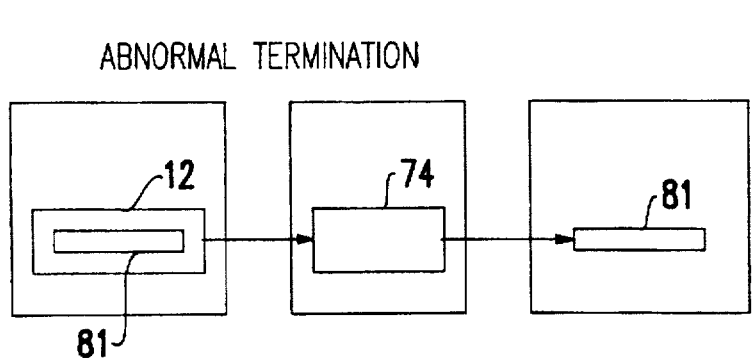

Referring to FIG. 7 (a) in step 1, the check data 85 is written in the read-write region 11 of the partial ROM optical disk medium 20. Since the check data 85 is written in the read-write region 11 normally, the normal termination signal is output from the first storage device 1.

Referring to FIG. 7 (b), in step 3, after receiving the normal termination signal, the control means 71 initiates the overwriting means 73. The overwriting means 73 overwrites the overwriting data 84 on the copy source data 81. However, the copy source data 81 is not destroyed by the overwriting data 84 because it is recorded on the read-only region 12. An abnormal termination signal is output from the optical disk drive 1' but it is not used.

Referring to FIG. 7 (c), in step 4, the copy means 74 is initiated. The copy source data 81 is copied from the optical disk drive 1' to the floppy disk drive 3' to generate the second generation data. Thus, the second generation data is normally generated from the first generation data previously recorded on the read-only region 12 of the partial ROM optical disk 20.

Figure 8A:
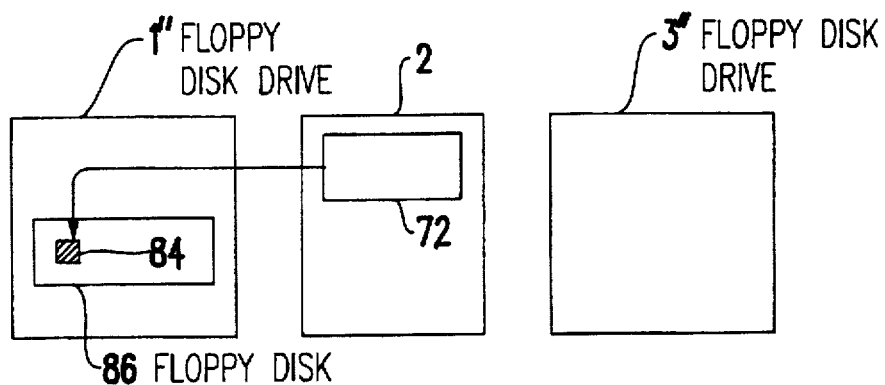
FIGS. 8 (a), 8 (b) and 8 (c) illustrate steps of preventing the generation of the third generation data in the first embodiment of the present invention.
Figure 8B:
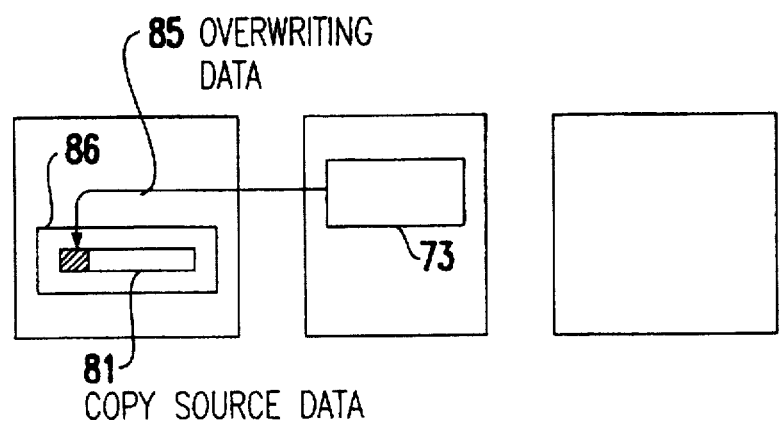
Figure 8C:
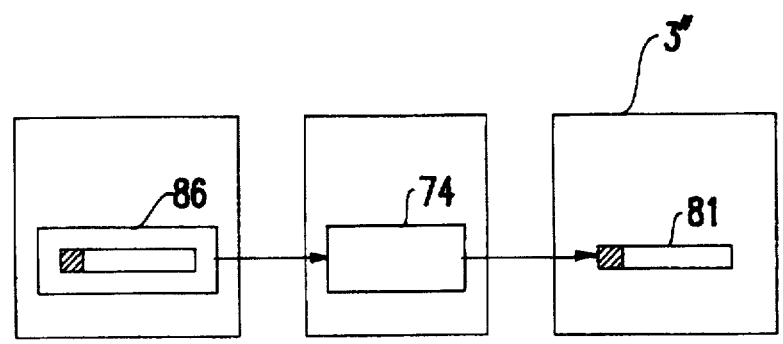

Next is described how the generation of the third generation data is prevented as shown in FIGS. 8(a)-8(c). The second generation data is recorded on a floppy disk 86. In this example, the first storage device 1 is a floppy disk drive 1" and the second storage device 3 is another floppy disk drive 3".

Referring to FIG. 8 (a), in step 1, the check data 84 is written in the floppy disk 86. If the floppy disk 86 is in the write-protect state, the copy operation is terminated in step 2. On the other hand, if the floppy disk 86 is in the write-enable state, the following steps are executed.

Referring to FIG. 8 (b), in step 3, the overwriting data 85 is overwritten on the copy source data 81. The copy source data is destroyed by the overwriting data 85 because the floppy disk 86 is in the write-enable state.

Referring to FIG. 8 (c), in step 4, the copy means 74 is initiated and the destroyed copy source data 81 is copied from the floppy disk drive 1" to the floppy disk drive 3". Thus, the generation of the third generation data is prevented.

As described above, the method according to the first embodiment of the present invention prevents the generation of the third generation data without special storage devices.

This feature is achieved by using the partial ROM medium which includes the read-only region and the read-write region.

Next is described the second embodiment of the present invention. The second embodiment is an application of the first embodiment to the copy protection system using "key data". In the second embodiment, the generation of a "third generation key disk" is prevented while the generation of a "second generation key disk" and the "replacement" of the second generation key disk are permitted.

Figure 9:
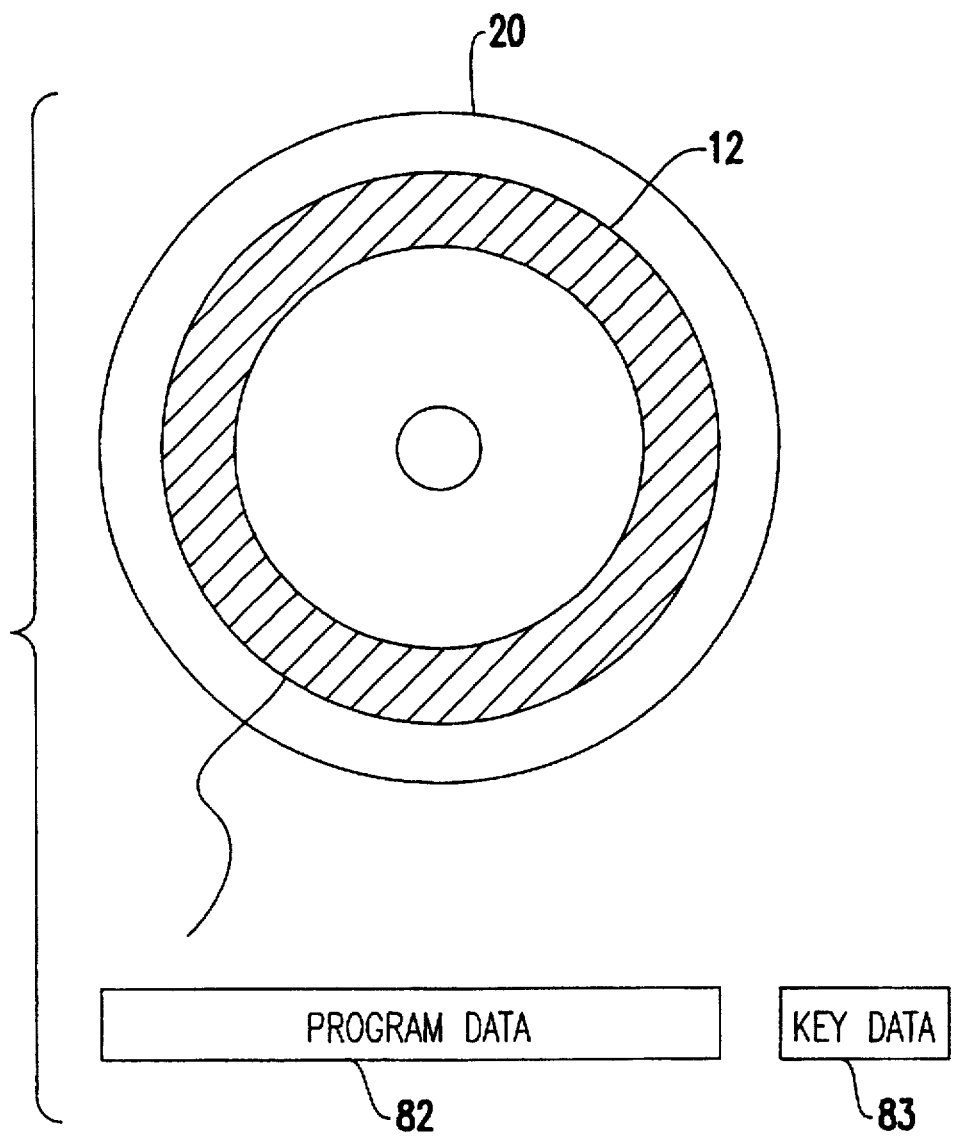
FIG. 9 shows data stored in the read-only region 12 of the partial ROM optical disk medium 20 according to a second embodiment of the present invention.

Referring to FIG. 9, in the second embodiment, the copy source data includes program data 82 and key data 83. The computer for executing the program data 82 is connected to a hard disk drive and a floppy disk drive. The program data 82 and the key data 83 are installed in the hard disk drive. The computer executes the program data 82 in the hard disk drive only when the key data 83 is also recorded on a floppy disk in the floppy disk drive. Therefore, the execution of the program data 82 is allowed only for the operator who has a floppy disk on which the key data 83 is recorded (hereinafter referred to as "key disk").

In this specification, a "second generation key disk" refers to a data recording medium (e.g., a floppy disk) storing second generation key data copied from an original disk.

A "third generation key disk" refers to a data recording medium (e.g., a floppy disk) storing third generation key data copied from the second generation key disk.

The "replacement of a second generation key disk" refers to the generation of a third generation key disk from a second generation key disk and subsequent destruction of the second generation key disk. The replacement of a second generation key disk is performed when the second generation key disk is worn out.

Referring again to FIG. 9, the program data 82 and the key data 83 are recorded on the ROM region 12 of the partial ROM optical disk medium 20.

Figure 10:
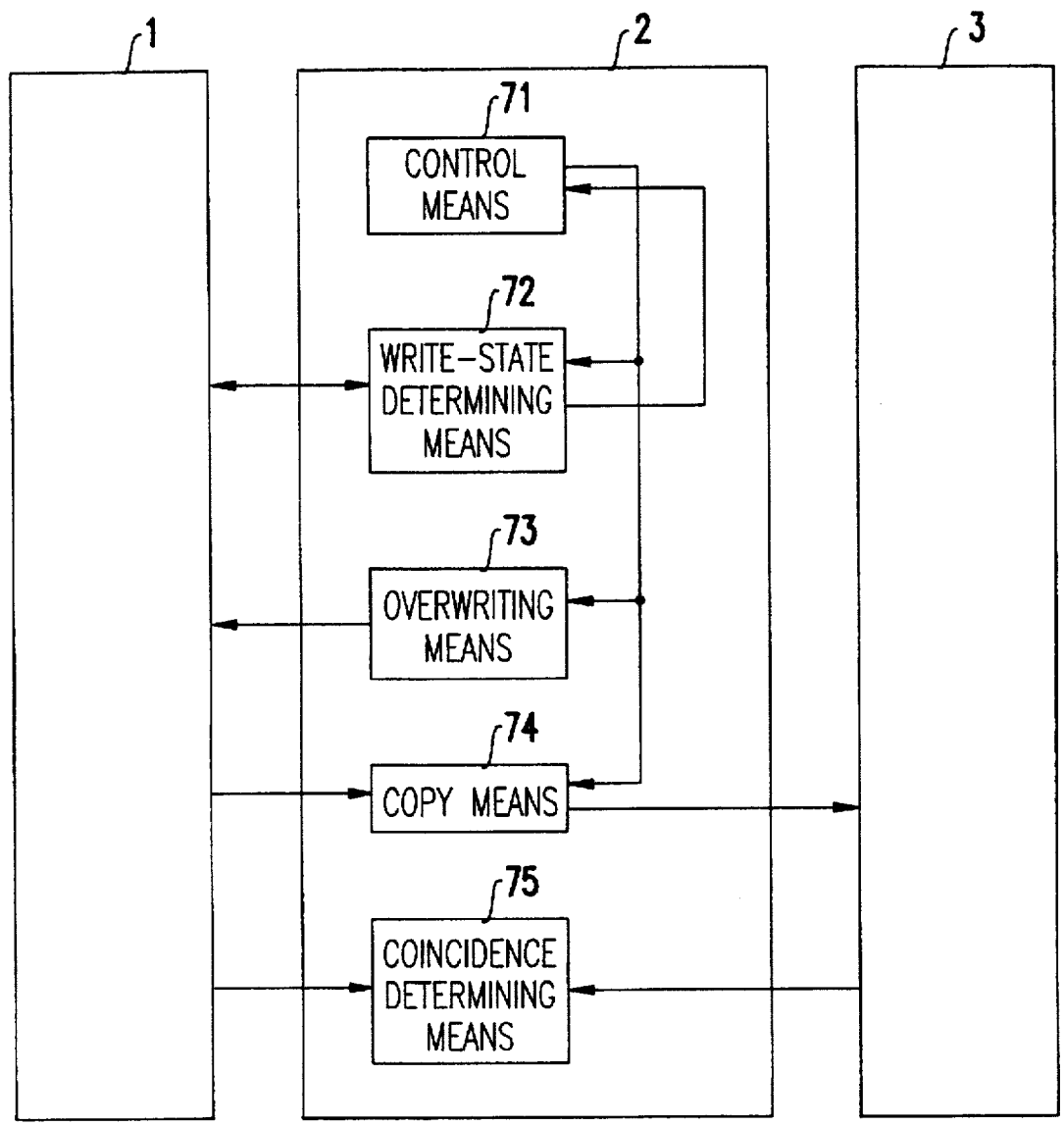
FIG. 10 is a block diagram showing the structure of the control apparatus 2 according to the second embodiment of the present invention.

Referring to FIG. 10, the control apparatus 2 according to the second embodiment includes control means 71, write-state determining means 72, overwriting means 73, copy means 74 and coincidence determining means 75. The write-state determining means 72 and copy means 74 are the same as those in the first embodiment. The overwriting means 73 of the second embodiment is the same as that in the first embodiment except that the overwriting data 84 is overwritten on the key data 83.

The coincidence determining means 75 is initiated upon the execution of the program 82. The coincidence determining means 75 reads the key data 83 out from both the first storage device 1 and the second storage device 3 and checks whether both of the key data 83 match. The program 82 can be executed only when the coincidence determining means 75 determines that both of the key data 83 match.

Next is described the steps of the copy operation executed by the control apparatus 2.

Figure 11:
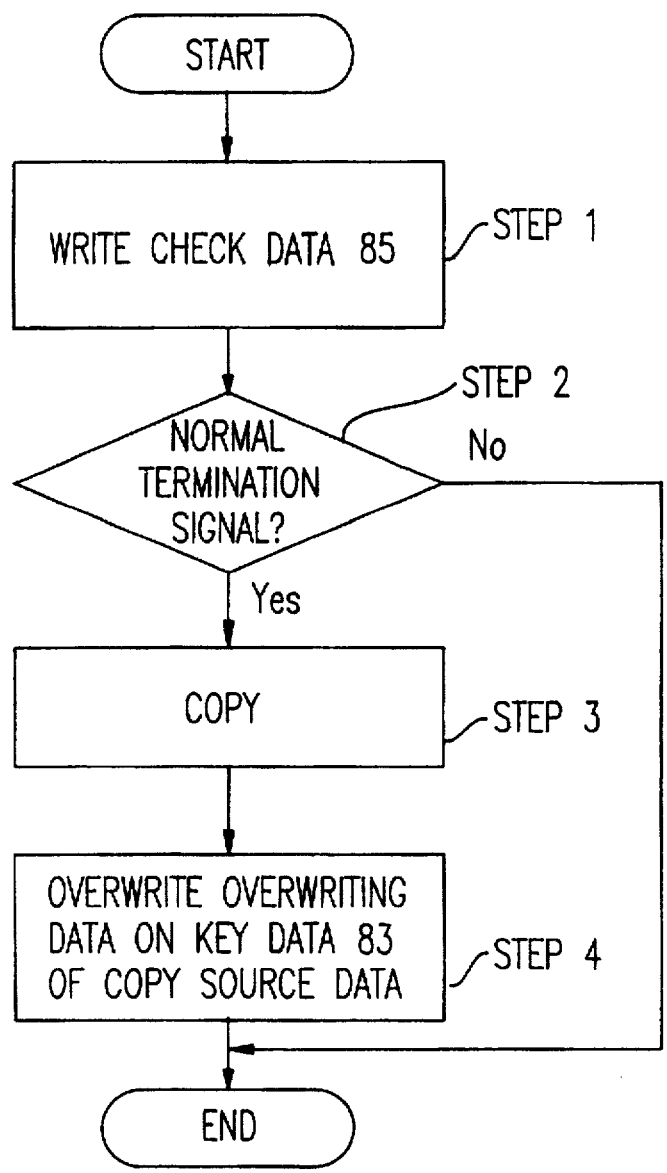
FIG. 11 is a flow-chart showing steps of the copy operation performed by the control apparatus 2 of the second embodiment of the present invention.

Referring to FIG. 11, steps 1 and 2 are the same as those in the first embodiment.

In step 3, the control means 71 initiates the copy means 74. The copy means 74 copies the copy source data including the program data 82 and the key data 83 from the first storage device 1 to the second storage device 3.

In step 4, the overwriting means 73 is initiated. The overwriting means 73 writes the overwriting data 84 on the key data 83 of the copy source data 81.

Next is described the operation of the coincidence determining means 75 when the program data 82 is executed.

Figure 12:
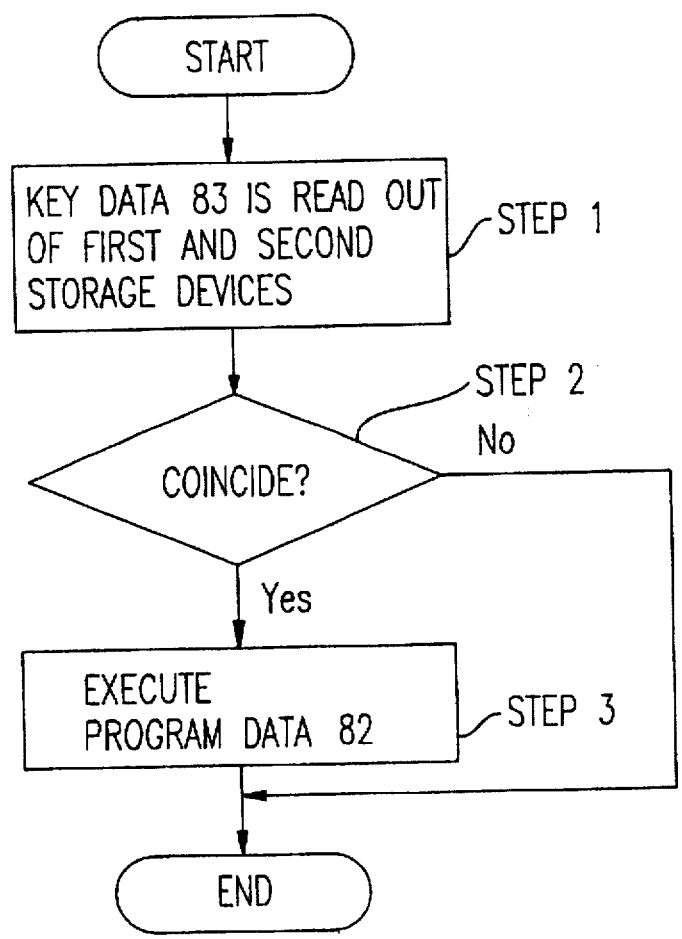
FIG. 12 is a flow-chart showing the operation of coincidence determining means 75 in the second embodiment of the present invention.
Figure 13A:
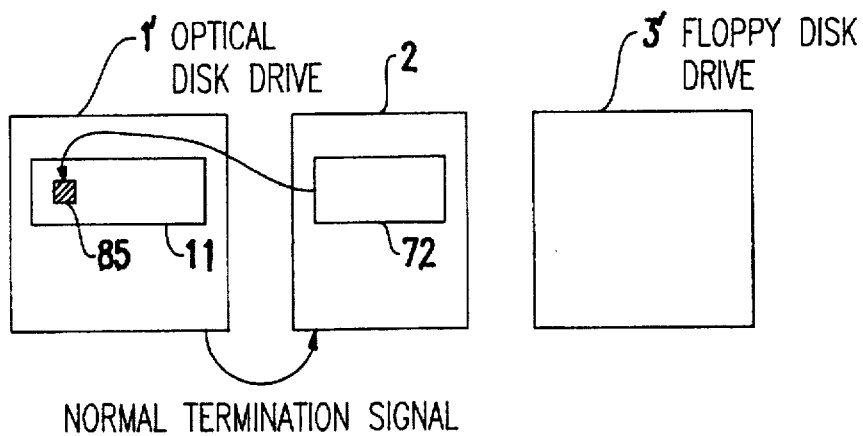
FIGS. 13(a), 13(b), 13(c) and 13(d) illustrates steps of generating a second generation key disk in the second embodiment of the present invention.
Figure 13B:
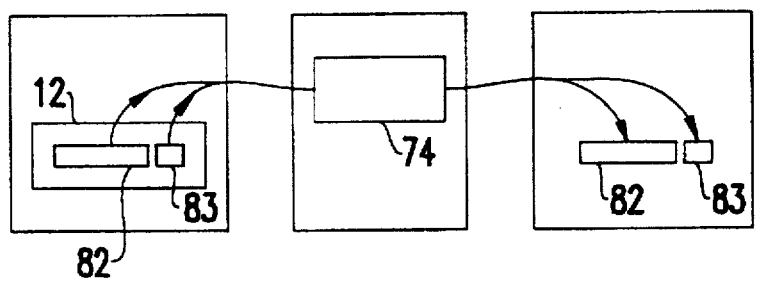
Figure 13C:
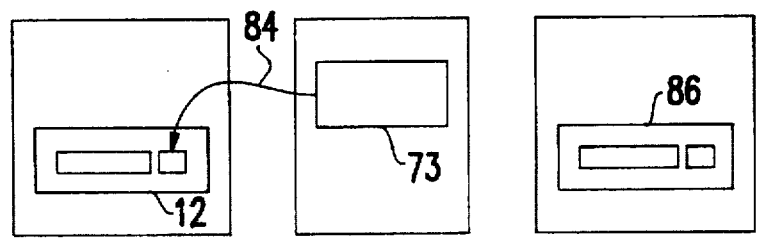
Figure 13D:
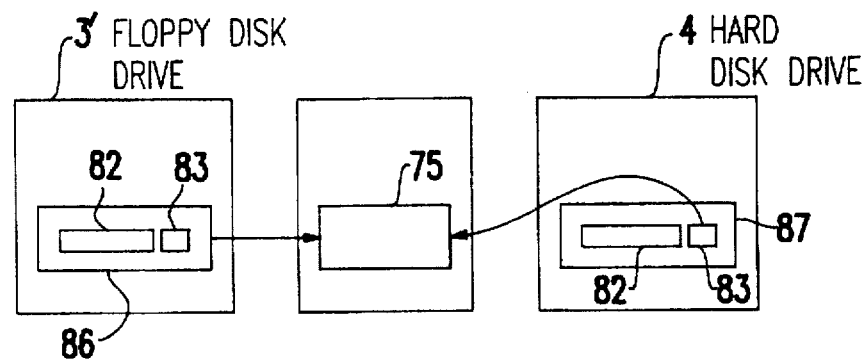

Referring to FIG. 12, in step 1, the coincidence determining means 75 reads out the key data 83 from the first storage device 1 and second storage device 3, respectively.

In step 2, the coincidence determining means 75 checks whether or not the two key data 83 match. When they do not match, the program data 82 is not executed. When they match, the program 82 is executed in step 3.

Next is described how the second generation key data and the second generation program data are generated. In this example, the first generation data is stored on the read-only region 11 of the partial ROM optical disk 20. The first storage device 1 is an optical disk drive 1'. The second storage device 3 is a floppy disk drive 3'.

Referring to FIG. 13 (a), in step 1, the check data 85 is written on the read-write region 11 of the partial ROM optical disk medium 20. The write operation is performed normally and the copy means 74 is initiated in step 2.

Referring to FIG. 13 (b), in step 3, the program data 82 and the key data 83 are copied from the optical disk drive 1' to the floppy disk drive 3'.

Referring to FIG. 13 (c), in step 4, the overwriting data 84 is overwritten on the key data 83 in the optical disk drive 1'. However, the key data 83 is not destroyed by the overwriting data 84 because the key data 83 is recorded on the read-only region 12 of the partial ROM optical disk 20. Thus, the second generation key disk 86 is generated.

Next is described the operation of the coincidence determining means 75.

Referring to FIG. 13 (d), the program data 82 and the second generation key data 83 are copied from the partial ROM optical disk 20 to a hard disk drive 4 according to the same process described above.

When the program data 82 in the hard disk drive 4 is executed, the key data 83 on the second generation key disk 86 in the floppy disk drive 3' and the key data 83 in the hard disk drive 4 are read out. When the two key data 83 match, the program data 82 in the hard disk drive 4 is executed. Otherwise, the program data 82 is not executed.

Next is described how the generation of the third generation key disk is prevented and how the replacement of the second generation disk is permitted. In this example, the first storage device 1 is a floppy disk drive 3'. The second storage device 3 is a floppy disk drive 3". The second generation key disk 86 is loaded in the floppy disk drive 3'.

Figure 14A:
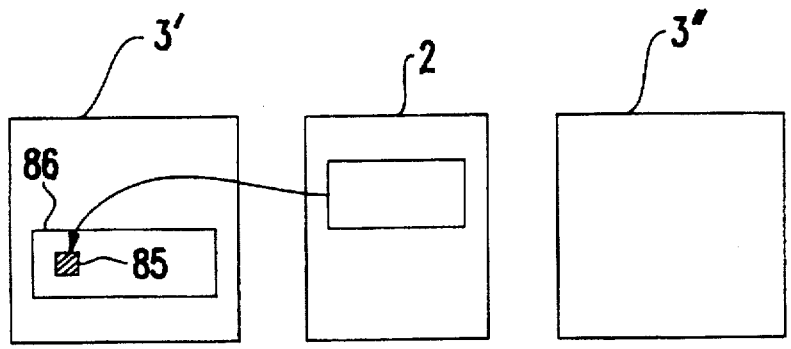
FIGS. 14(a), 14(b) and 14(c) illustrate steps of replacing the second generation key disk and protecting the generation of a third generation key disk.
Figure 14B:
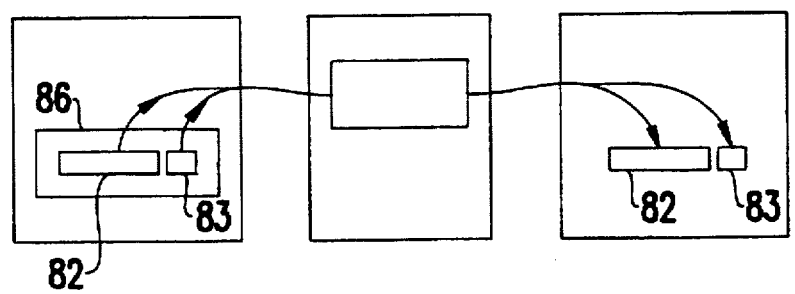
Figure 14C:
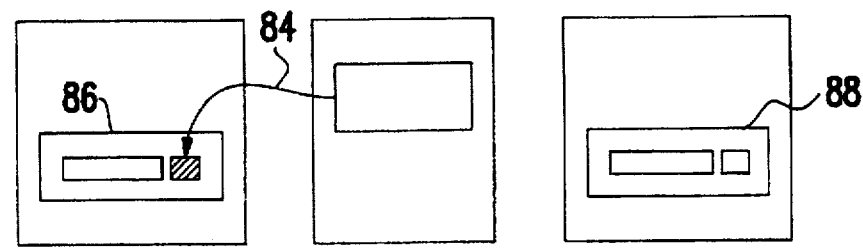

Referring to FIG. 14 (a), in step 1, the check data 85 is written in the floppy disk 86. If the second generation key disk 86 is in the write-protect state, the copy operation is terminated in step 2. On the other hand, if the second generation key disk 86 is in the write-enable state, the copy means 74 is initiated.

Referring to FIG. 14 (b), in step 3, the copy means 74 copies the program data 82 and key data 83 from the floppy disk drive 3' to the floppy disk drive 3".

Referring to FIG. 14 (c), in step 4, the overwriting data 84 is overwritten on the key data 83 of the second generation key disk 86. The key data 83 on the second generation key disk 86 is destroyed by the overwriting data 84 because the key disk 86 is in the write-enable state. Thus, the second generation key data 86 is destroyed and replaced with a new second generation disk 88.

Next is described how the original data on the partial ROM optical disk 20 is installed.

Figure 15:
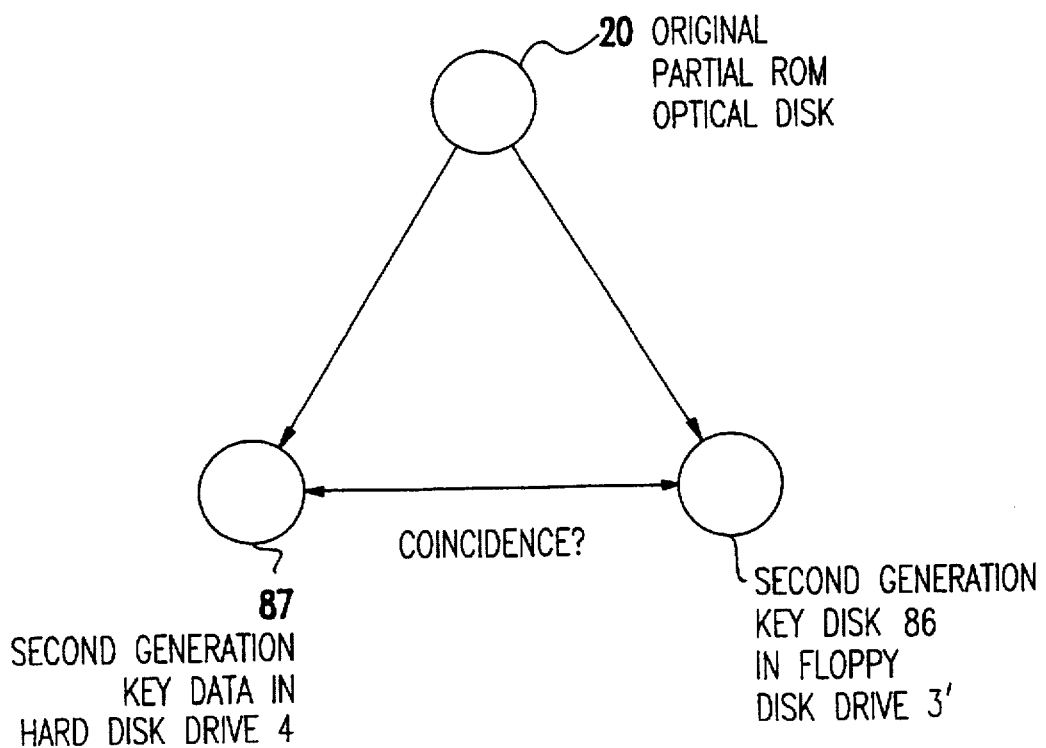
FIG. 15 illustrates the installation of the original data in the partial ROM optical disk 20 in the second embodiment of the present invention.

Referring to FIG. 15, typically, the first generation program data and first generation key data are copied from the original partial ROM optical disk 20 to the second generation key disk 86 in the floppy disk drive 3' and to the hard disk drive 4. After this installation, the second generation key disk 86 is used as the key disk when the program data 82 in the hard disk drive 4 is executed. Thus, in the second embodiment, the original partial ROM disk 20 is not used as the key disk and is not damaged. When the second generation key disk 86 is worn out, the old second generation disk 86 is replaced with the new second generation data disk 88 according to the procedure in FIG. 14.

Next is described a modification of the second embodiment.

First, the key data 83 may be stored in the SFP region 10 of the partial ROM optical disk 20 instead of the read-only region. In this case, the control information stored in the SFP region 10 may be used as the key data 83.

Second, the coincidence determining means 75 may be implemented by a part of the program data 82.

The present embodiments are therefore, to be considered in all respects as illustrative and not restrictive, the scope of the invention being indicated by the appended claims rather than by the foregoing description and all changes which come within the meanings and range of equivalency of the claims are therefore intended to the embraced therein.

What is claimed is:

1. A method for copying source data from a first medium to a second medium, said first medium including first and second regions, said source data being recorded on said second region of said first medium, said method comprising steps of:

(a) attempting to write check data on said first region of said first medium;

(b) terminating said method when said check data cannot be written on said first region, but writing said check data on said first region of said first medium when said check data can be written;

(c) overwriting said source data; and (d) copying said source data from said first medium to said second medium.

2. A method according to claim 1, further comprising a step of: providing a partial read-only memory (ROM) medium as said first medium and providing a read-write region and a read-only region of said partial ROM medium as said first and second regions, respectively.

3. A method for copying source data from a first medium to a second medium, said first medium including first and second regions, said source data being recorded on said second region of said first medium, said method comprising steps of:

(a) attempting to write check data on said first region of said first medium;

(b) terminating said method when said check data cannot be written on said first region, but writing said check data on said first region of said first medium when said check data can be written;

(c) copying said source data from said first medium to said second medium; and (d) overwriting said source data on said second region of said first medium.

4. A method according to claim 3, further comprising a step of providing program data and key data as said source data, said step of overwriting comprises a step of overwriting said key data of said source data.

5. A method according to claim 4, said method further comprising steps of:

(e) reading out first key data from a third medium;

(f) reading out second key data from a fourth medium; and (g) executing said program data on said fourth medium when said first key data matches said second key data.

6. A method according to claim 4, further comprising a step of: providing a partial read-only memory (ROM) medium as said first medium and providing a read-write region and a read-only region of said partial ROM medium as said first and second regions, respectively.

7. A method according to claim 6, wherein said step of providing a partial ROM medium further comprises a step of providing a standard format pattern region for storing said key data in said partial ROM medium.

8. A method according to claim 7, wherein said key data includes at least a part of control information recorded in said standard format pattern region.

9. A method according to claim 5, wherein said steps (e)-(g) are executed by said program data on said second medium.

* * * * *